May 13, 1958 — P. L. McMICHAEL — 2,834,465
SWIVEL HOSE ASSEMBLY
Filed April 25, 1955 — 2 Sheets-Sheet 1

INVENTOR
PALMER L. McMICHAEL
BY
ATTORNEY

May 13, 1958 P. L. McMICHAEL 2,834,465
SWIVEL HOSE ASSEMBLY
Filed April 25, 1955 2 Sheets-Sheet 2

INVENTOR
PALMER L. McMICHAEL
BY
ATTORNEY

United States Patent Office 2,834,465
Patented May 13, 1958

2,834,465
SWIVEL HOSE ASSEMBLY

Palmer L. McMichael, Torrance, Calif., assignor to Allen T. Chase, doing business as Standardized Aircraft, Los Angeles, Calif.

Application April 25, 1955, Serial No. 503,408

1 Claim. (Cl. 210—95)

This invention relates to an improved swivel hose assembly and has for one of its principal objects the provision of means for conveniently and efficiently transferring liquids and fluids from one container to another, and the invention has particular application in connection with such liquid transfers when employed in connection with aircraft, guided missiles and the like.

One of the important objects of this invention is the provision in a device of the class described of means for providing adequate air venting and duct means whereby air or other fluid displaced from the container being filled by a liquid will be simultaneously transferred to the container which is being emptied, whereby undesirable regurgitation is prevented.

Another important object of the invention resides in the provision of a flexible double-walled liquid or fluid hose and swivel coupling which can be employed in practically all operating positions with little or no danger of kinking or buckling.

A still further important object is to provide in a swivel hose coupling for liquids and fluids, adequate sealing means whereby undesirable leaks will be prevented, while at the same time suitable readily made connections to supply and receiving containers are almost instantaneously available.

Yet another important object of the invention is to provide in combination with such a swivel hose coupling, strainers and sight glasses whereby foreign matter and other impurities will be eliminated from the material being transferred, while at the same time, the passage of the fluid or liquid through the transfer means of this invention will be visible for continuous or intermittent inspection as circumstances may require.

Other and further important objects of the invention will be apparent from the disclosures in the accompanying drawings and following specification.

The invention, in a preferred form, is illustrated in the drawings and hereinafter more fully described.

Figure 1:
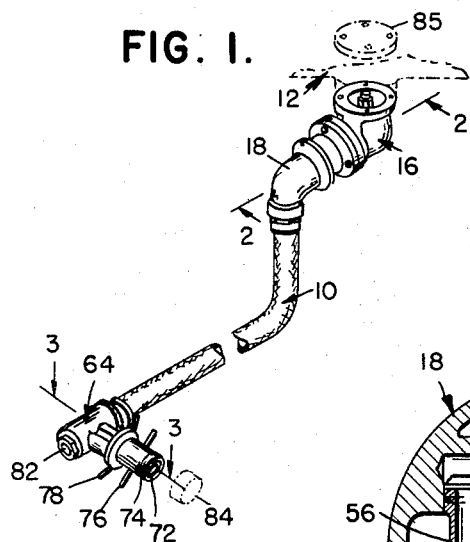
Figure 1 is a perspective view of the improved swivel hose assembly of this invention, and illustrating generally its uses and purposes.
Figure 3:
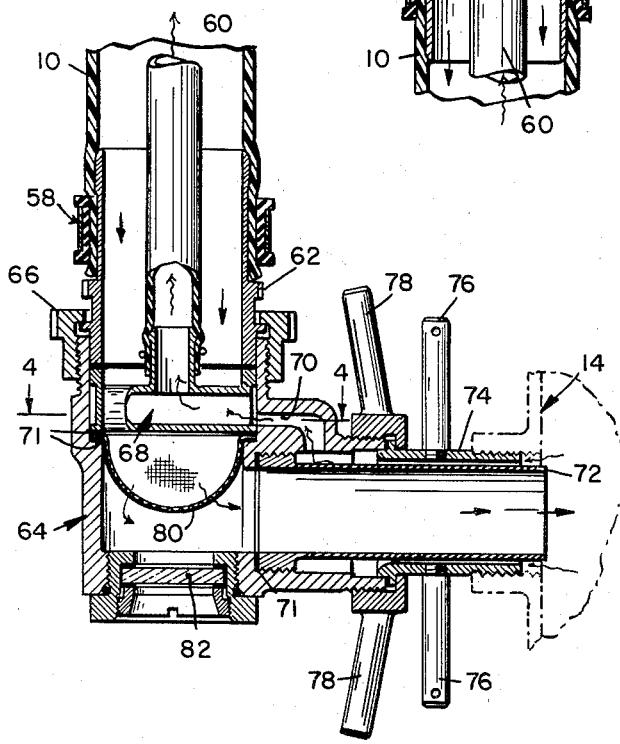
Figure 3 is also an enlarged section, this being taken on the line 3—3 of Figure 1, looking in the direction indicated.
Figure 4:
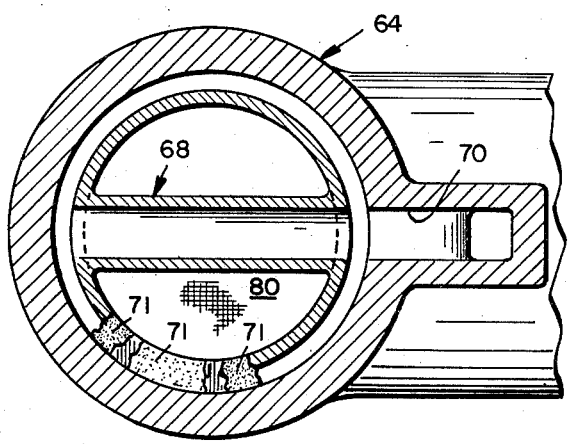
Figure 4 is a still further enlarged section on the line 4—4 of Figure 3.

The reference numeral 10 indicates generally the flexible hose forming part of the novel device of this invention, the same having swivelled connecting elements at each end whereby the hose can be used to conveniently transfer liquids or fluids from a supply tank such as that indicated at 12 in Figure 1, to some other container such as that indicated at 14 in Figure 3.

The hose 10 is for the purposes of this invention composed of some plastic, pliable material, but can be of any desired construction or composition and of course may be of any practicable length.

Figure 2:
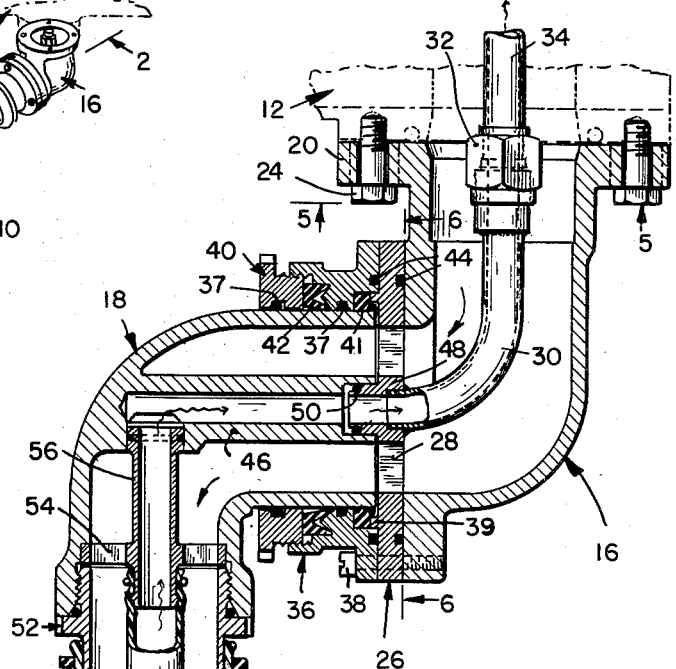
Figure 2 is an enlarged detail section taken on the plane of the line 2—2 of Figure 1, looking in the direction of the arrows.
Figure 5:
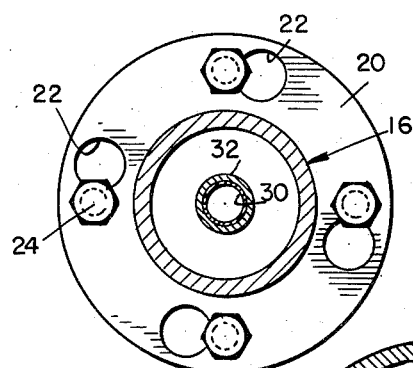
Figure 5 is a horizontal section on the line 5—5 of Figure 2, looking upwardly and showing one of the quick connection constructions.

As best shown in Figure 2, one end of the hose terminates in a coupling adapted to be removably fastened to the source of fluid supply 12, this coupling comprising a swivelled connection between two interfitting pipe joint elements 16 and 18, each of which is preferably in "elbow" form. The section 16 is provided with an integral flange 20, and as best shown in Figure 5, this flange has a series of circumferential bayonet slot openings 22 for the reception of fastening bolts 24, whereby attachment to or removal from the supply tank 12 can be expeditiously accomplished.

Figure 6:
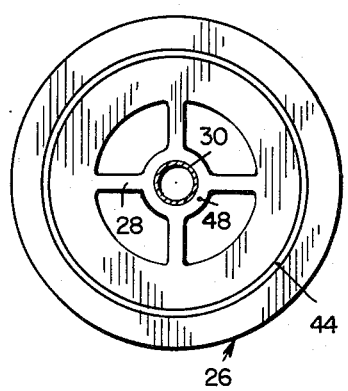
Figure 6 is a vertical section on the line 6—6 of Figure 2, illustrating means for positoining and supporting the inside vent pipe.

Adapted to be fastened to the other face of the elbow joint 16 is an annulus 26 (Figure 6) which includes a web structure and support 28. This is for the purpose of supporting a portion of the air vent or duct tube 30 while at the same time allowing free passage of fluid through the coupling 16—18.

The vent tube 30 conforms in shape to the interior outlines of the elbow 16 and is provided with a coupling element 32 by which it is joined to a further vent pipe or the like 34 leading into the supply tank 12 (Figure 2).

An annulus 36 is fastened to the outer periphery of the annulus web combination 26—28 by bolts or the like 38, and this internally screw-threaded at its outer end for the reception of a correspondingly screw-threaded fastening or packing ring 40.

The annulus 36 is interiorly recessed for the reception of a retaining ring 41, and a sealing ring 42, the retaining ring 41 bearing against an integral shoulder 39 which forms part of the ring 26. Bearing rings 37 are fitted into corresponding slots in the elements 36 and 40, and this construction accordingly provides a free swivel action of the element 18 with respect to the element 16, while at the same time assuring against possible leaks. The retaining and packing rings can be of various types and compositions and are preferably of long wearing material resistant to the action of acids or other liquids which may be passed through the fitting.

The corresponding elbow joint 18 is rotatably but non-leakably fitted into the gland element 36—40, and this includes an integral central inner duct 46 which connects with the tube or duct 30 through the corresponding central section 48 of the web 28. A rotatable but leak-proof seal at this point is accomplished by means of an O-ring or the like 50.

The other end of the elbow 18 is internally screw-threaded and accommodates a hose coupling tube or the like 52 and a webbed support 54 for a corresponding air duct section or the like 56 is provided. One end of the hose 10 is fitted on to the pipe or sleeve 52 and is usually held in place by a clamp and pad combination 58. A central internal air duct or hose 60 is fitted inside the hose 10 and is connected to the corresponding terminal of the tube and web combination 54—56 in any conventional manner.

The other end of the hose 10 is fastened on to a sleeve 62 (Figure 3) by another connector or clamp 58, and this sleeve 62 is non-leakably but rotatably connected to a pipe or other fitting 64 by means of a packing gland 66. This fitting 64 has a T-shaped air vent or duct 68 placed therein beyond the end of the hose connecting sleeve 62, and this communicates with a passage 70 in the fitting 64, the farther end of this passage communicating with the interior of the receptacle 14 by means of an air space between a sleeve 72 and an externally screw-threaded tube 74 which can be conveniently temporarily fastened to the receptacle 14 by the manipulation of handles or the like 76 and 78. Gaskets 71 seal the end of the tube 72 against leakage at that point and in the fitting 64 for a similar purpose.

A strainer 80 is placed in the fitting 64, as best shown in Figure 3, and a sight glass 82 is also mounted in the fitting so that interior action may be observed. A swivel action at this end of the device is accomplished because the tube 74 is rotatable in the fitting 64 and free rotation is permitted by manipulation of the handle elements 76 and 78.

A removable cap 84 is provided for protecting the threaded end of the pipe 74 when the same is not in use, as indicated in Figure 1, and proper leak-sealing gaskets are provided at all necessary points as shown. A similar removable protective cap 85 can be provided for the outer face of the fitting 16 when the same is not in use, also as best shown in Figure 1.

Figure 7:
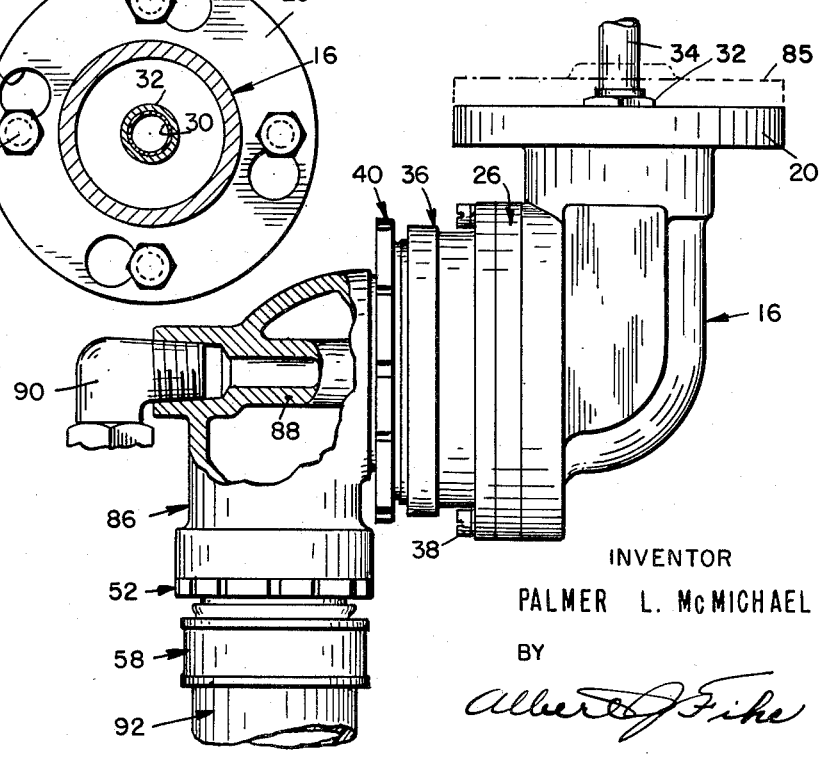
Figure 7 is an external view, partly in section, of a swivel connection constructed in accordance with this invention and showing a slight modification.

In Figure 7, a slightly modified form of the invention is illustrated, wherein an elbow 16 is shown provided with the duct 34 and packing gland and other connections 26 and 40.

However, the associated elbow 86 is provided with an internal integral duct 88 which terminates outside the casing 86 and is fitted with an elbow or other coupling element 90 to which an exterior duct or air hose can be applied. This eliminates the necessity of carrying a corresponding interior tube through the hose 92 and similar suitable connections can be made to a fixture substantially the same as that shown in Figure 3, with slight but obvious adaptations.

It will be evident that herein is provided a swivel hose assembly which is particularly adaptable for the quick and efficient transfer of fluids from one receptacle to another, and especially in cases where such fluids are difficult to handle and where rapid transfer of displaced air is necessary. The device lends itself particularly for employment in scientific and military work, and the fact that almost universal connections can be made with little or no difficulty considerably enhances the potentialities of the structure of this invention.

I am aware that many changes may be made and numerous details of construction varied throughout a wide range without departing from the principles of this invention, and I therefore do not propose limiting the patent granted hereon otherwise than as necessitated by the prior art.

I claim as my invention:

A swivel hose assembly comprising a length of flexible hose, a swivelled coupling at each end of the hose, means for removably fastening one swivelled coupling to a source of fluid supply, means for similarly fastening the other coupling to a receptacle, a continuous series of vent ducts in parallel with the hose and coupling assembly, the swivel at one end of the hose including a web for supporting the duct portions, one portion of said swivel including an integral duct portion, a removable duct portion with a supporting web mounted in said swivel section, the swivel connection at the other end of the hose including a strainer and sight glass, the swivel connection at the first end of the hose comprising a sleeve, a screw-threaded tube rotatably mounted on the sleeve, means for rotatably but non-leakably maintaining said tube in position on the sleeve, said means including manually operated handles, the strainer and sight glass mounting additionally including a passageway for displaced air, and wherein a portion of said series of air ducts is inside the swivelled fittings and wherein another portion of the air duct is outside the hose, integral duct exit studs on certain of the swivel connections, the air duct connection in one of the swivels including a T-shaped fitting, the vent duct at one end of the coupling extending into the source of fluid supply and comprising a removable pipe and the vent duct at the receptacle end of the coupling including a fixed sleeve and a rotatable connecting pipe mounted exteriorly of the sleeve and spaced therefrom.

References Cited in the file of this patent
UNITED STATES PATENTS

| Number | Name | Date |
|---|---|---|
| 508,767 | Schirrmacher | Nov. 14, 1893 |
| 894,594 | Coni | July 28, 1908 |
| 1,180,806 | Vedder | Apr. 25, 1916 |
| 1,677,923 | Marden | July 24, 1928 |
| 1,804,810 | Reedy | May 12, 1931 |
| 1,885,614 | Main | Nov. 1, 1932 |
| 2,200,082 | Guarnaschelli | May 7, 1940 |
| 2,300,547 | Guarnaschelli | Nov. 3, 1942 |
| 2,349,696 | Behrens | May 23, 1944 |
| 2,673,748 | Shaw | Mar. 30, 1954 |